(12) United States Patent
Tachimoto

(10) Patent No.: US 11,787,303 B2
(45) Date of Patent: Oct. 17, 2023

(54) PARKING SYSTEM

(71) Applicant: SUBARU CORPORATION, Tokyo (JP)

(72) Inventor: Kazuya Tachimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 361 days.

(21) Appl. No.: 17/321,895

(22) Filed: May 17, 2021

(65) Prior Publication Data

US 2021/0380011 A1   Dec. 9, 2021

(30) Foreign Application Priority Data

Jun. 3, 2020 (JP) .................................. 2020-096867

(51) Int. Cl.
| | | |
|---|---|---|
| *H02J 7/00* | (2006.01) | |
| *B60L 53/62* | (2019.01) | |
| *B60L 50/60* | (2019.01) | |
| *B60L 58/12* | (2019.01) | |
| *B60L 53/36* | (2019.01) | |
| *G05B 15/02* | (2006.01) | |
| *B60L 53/57* | (2019.01) | |
| *G06Q 10/0631* | (2023.01) | |
| *B60L 58/16* | (2019.01) | |

(52) U.S. Cl.
CPC ............... *B60L 53/62* (2019.02); *B60L 50/60* (2019.02); *B60L 53/36* (2019.02); *B60L 53/57* (2019.02); *B60L 58/12* (2019.02); *B60L 58/16* (2019.02); *G05B 15/02* (2013.01); *G06Q 10/06312* (2013.01); *G06Q 10/06315* (2013.01); *Y02T 10/70* (2013.01)

(58) Field of Classification Search
CPC .......... B60L 53/36; B60L 53/57; B60L 53/62; B60L 58/12; B60L 58/16; B60L 50/60; G06Q 10/06312; G06Q 10/06315; Y02T 10/70; G05B 15/02
USPC ............................................ 320/109; 701/22
See application file for complete search history.

(56) References Cited

U.S. PATENT DOCUMENTS

| | | | | |
|---|---|---|---|---|
| 11,142,924 B1 * | 10/2021 | Cha | ........................... | E04H 6/42 |
| 2019/0126765 A1 * | 5/2019 | Seo | ......................... | B60L 53/36 |

FOREIGN PATENT DOCUMENTS

JP          5754722 B2      7/2015

* cited by examiner

*Primary Examiner* — Zixuan Zhou
(74) *Attorney, Agent, or Firm* — McDermott Will & Emery LLP

(57) ABSTRACT

A parking system includes a parking facility, a moving device, charging and discharging equipment, a battery-state detector, and a control processor. The control processor is configured to cause the moving device to move, to a first parking lot with a high temperature, vehicles in the parking facility scheduled to travel, and to move, to a second parking lot with a low temperature, vehicles not scheduled to travel. The control processor is configured to cause or instruct the charging and discharging equipment to perform charging of a drive battery of an unsatisfied vehicle on the basis of a state-of-charge value of drive batteries of the vehicles present in the first parking lot detected by the battery-state detector. The unsatisfied vehicle is a vehicle that is the vehicle in the first parking lot and whose drive battery has a charge state that does not reach a predetermined charge state.

10 Claims, 6 Drawing Sheets

PARKING SYSTEM

CROSS-REFERENCE TO RELATED APPLICATIONS

The present application claims priority from Japanese Patent Application No. 2020-096867 filed on Jun. 3, 2020, the entire contents of which are hereby incorporated by reference.

BACKGROUND

The technology relates to a parking system, for example, to a parking system for a vehicle including a drive battery for vehicle driving.

Regarding an electric vehicle, charging of a drive battery may be an important issue. In terms of time required for charging, it may be favorable to charge the drive battery while the electric vehicle is parked and is not in use. For example, Japanese Patent No. 5754722 discloses a parking system that is able to charge a drive battery of an electric vehicle while the electric vehicle is parked.

SUMMARY

An aspect of the technology provides a parking system that includes a parking facility, a moving device, charging and discharging equipment, a battery-state detector, and a control processor. The parking facility includes a first parking lot with a high temperature and a second parking lot with a low temperature. The moving device is configured to move vehicles in the parking facility. Each of the vehicles includes each of the drive batteries for driving each of the vehicles. The charging and discharging equipment is configured to charge and discharge the drive batteries of the vehicles. The battery-state detector is configured to detect at least state-of-charge values of the drive batteries of the vehicles. The control processor is configured to cause the moving device to move, to the first parking lot, first vehicles that are among the vehicles and scheduled to travel. The control processor is configured to cause the moving device to move, to the second parking lot, second vehicles that are among the vehicles and not scheduled to travel. The control processor is configured to identify an unsatisfied vehicle from the first vehicles on a basis of state-of-charge values of drive batteries of the first vehicles present in the first parking lot detected by the battery-state detector. The unsatisfied vehicle includes a drive battery of which a charge state does not reach a predetermined charge state. The control processor is configured to cause or instruct the charging and discharging equipment to perform charging of the drive battery of the unsatisfied vehicle.

An aspect of the technology provides a parking system that includes a parking facility, a moving device, charging and discharging equipment, a battery-state detector, and circuitry. The parking facility includes a first parking lot with a high temperature and a second parking lot with a low temperature. The moving device is configured to move vehicles in the parking facility. Each of the vehicles includes each of the drive batteries for driving each of the vehicles. The charging and discharging equipment is configured to charge and discharge the drive batteries of the vehicles. The battery-state detector is configured to detect at least state-of-charge values of the drive batteries of the vehicles. The circuitry is configured to cause the moving device to move, to the first parking lot, first vehicles that are among the vehicles and scheduled to travel. The circuitry is configured to cause the moving device to move, to the second parking lot, second vehicles that are among the vehicles and not scheduled to travel. The circuitry is configured to identify an unsatisfied vehicle from the first vehicles on a basis of state-of-charge values of drive batteries of the first vehicles present in the first parking lot detected by the battery-state detector. The unsatisfied vehicle includes a drive battery of which a charge state does not reach a predetermined charge state. The circuitry is configured to cause or instruct the charging and discharging equipment to perform charging of the drive battery of the unsatisfied vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A parking system that is configured to charge a drive battery of an electric vehicle while the electric vehicle is parked may include, for example, a parking space for charging provided at a predetermined location among a plurality of parking spaces. When a pallet carrying an electric vehicle is moved to the parking space for charging, the drive battery of the electric vehicle on the pallet may be charged by charging and discharging equipment provided in the parking space for charging. If a new electric vehicle requiring charging of a drive battery comes into the parking system while the parking space for charging is full, a pallet carrying the new vehicle may be temporarily placed in a vacant parking space. When the charging of the drive battery of the electric vehicle in the parking space for charging is completed, the pallet carrying the charged electric vehicle may be moved to another parking space, and the pallet carrying the electric vehicle waiting for charging may be moved to the parking space for charging, allowing the drive battery thereof to be charged.

A drive battery included in an electric vehicle, such as a lithium-ion battery, has a trade-off property. That is, a low temperature of the drive battery may result in decrease in chargeable and dischargeable electric power of the drive battery; on the other hand, a high temperature of the drive battery may result in easier degradation of the drive battery. A parking facility may have two functions: a function as a vehicle storage facility; and a function as a facility to place vehicles to be used or to travel, i.e., a function as a vehicle dispatch facility. However, it is difficult to find a parking system that is able to dispatch and store electric vehicles while keeping a favorable balance of the trade-off property related to the temperature of the drive battery described above.

It is desirable to provide a parking system that is able to dispatch and store an electric vehicle while keeping a favorable balance of a trade-off property related to a temperature of a drive battery.

Figure 1:
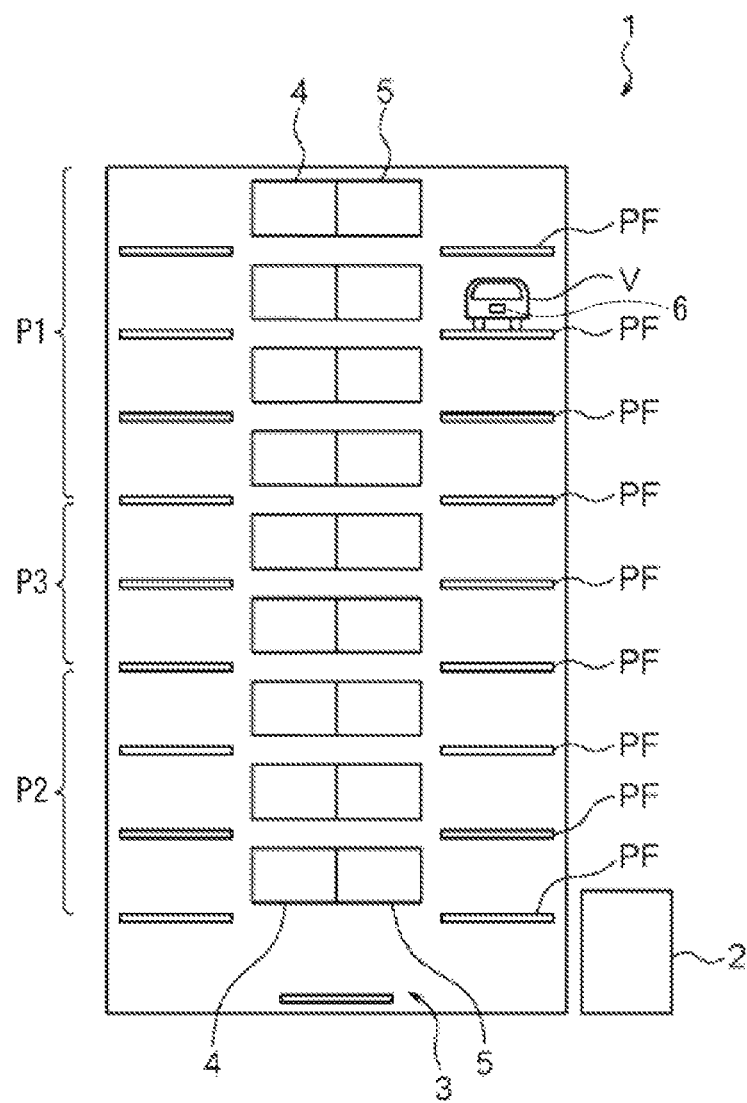
FIG. 1 is a diagram illustrating an example of a schematic configuration of a parking system according to one embodiment of the technology.
Figure 2:
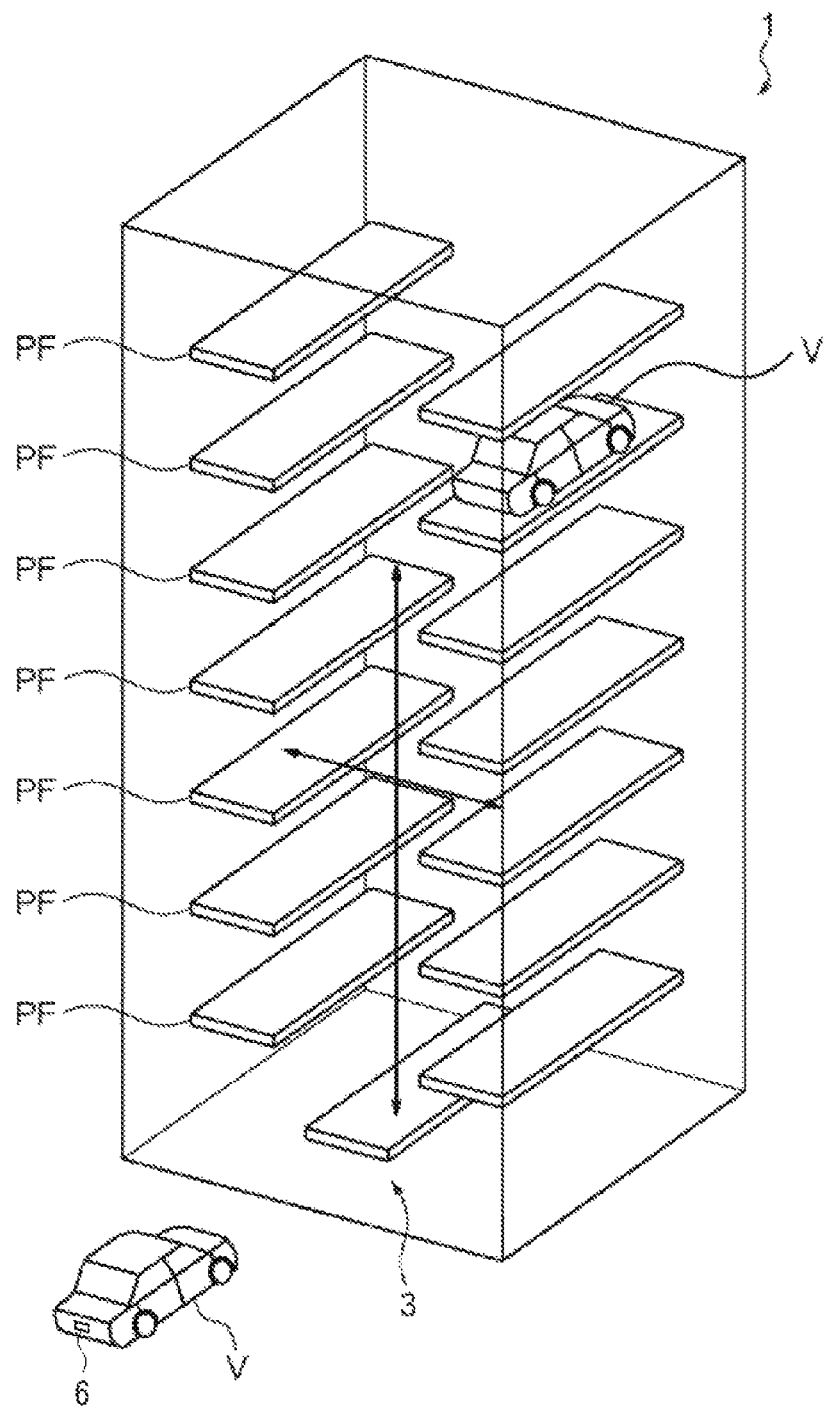
FIG. 2 is an explanatory diagram illustrating an example of a parking facility illustrated in FIG. 1.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. FIG. 1 illustrates an example of a schematic configuration of a parking system according to an example embodiment of the technology. FIG. 2 is an explanatory diagram illustrating a parking facility 1 illustrated in FIG. 1. The parking system of the example embodiment may handle, as a vehicle V to be parked, only an electric vehicle that includes only a motor as a driving source of the vehicle, and includes, for example, a lithium-ion battery as the driving battery to drive the motor. The vehicle V in the example embodiment may include, for example, a battery-state detector 6, such as a battery checker, that detects a state-of-charge (SOC) value and a state-of-health (SOH) value of the drive battery included in the vehicle V. The vehicle V may transmit the detected SOC value and the detected SOH value to a control unit 2 via an unillustrated wireless communication unit. The control unit 2 will be described later. In one example embodiment, a value such as the SOC value or the SOH value of the drive battery of the vehicle V may be detected by any device other than the battery checker described above.

The parking system may include the parking facility 1, for example. The parking facility 1 may be, for example, a multistory parking facility illustrated in FIG. 2. The parking facility 1 may have a gateway for the vehicle V on the lowest floor, for example. The lowest floor is not necessarily the ground floor. In the parking facility 1, for example, an elevating device 3 may move the vehicle V in an upper-lower direction of the parking facility 1. The parking facility 1 may have a plurality of parking floors PF provided in the upper-lower direction. The vehicle V moved upward or downward to any of the parking floors PF may be moved to and parked in a parking space on that parking floor PF. The vehicle V may be moved to the parking space on any of the parking floors PF, for example, by placing the vehicle V on a pallet, and moving the pallet in a substantially horizontal direction. In one embodiment, devices related to such moving in the upper-lower direction, the substantially horizontal direction, and any other direction may serve as a "moving device". The moving of the vehicle V by the moving device may be controlled by the control unit 2 which will be described later.

The parking floors PF of the parking facility 1 may each be provided with charging and discharging equipment that performs charging and discharging of the drive battery of the vehicle V. In one specific but non-limiting example, the parking floors PF of the parking facility 1 may each be provided with: quick charging and discharging equipment 4 that charges the drive battery of the vehicle V with use of a commercial power supply; and inter-vehicle charging and discharging equipment 5 that charges the drive battery of the vehicle V with use of electric power of a drive battery of another vehicle V. In the example embodiment, the quick charging and discharging equipment 4 and the inter-vehicle charging and discharging equipment 5 may independently control charging and discharging of the vehicle V on the corresponding parking floor PF in accordance with an instruction given by the control unit 2 which will be described later. However, in another example embodiment, the control unit 2 may control each of the quick charging and discharging equipment 4 and the inter-vehicle charging and discharging equipment 5. In the example embodiment, the term "quick charging and discharging equipment" or "quick charging" is used for easier distinction from the "inter-vehicle charging and discharging equipment" or "inter-vehicle charging". However, instead of the "quick charging and discharging equipment" or the "quick charging", "usual charging and discharging equipment" or "usual charging" may be used. Moreover, in one example embodiment, both the quick charging and discharging equipment and the usual charging and discharging equipment may be provided.

The control unit 2 may include a computer system. In one embodiment, the computer system may serve as a "control processor". As with the known computer systems, the computer system of the control unit 2 may include not only a calculation processor having an advanced calculation process ability but also devices including, without limitation: a storage device that stores a program; and an input and output device that reads a sensor signal and performs mutual communication with another control unit. Note that the control unit 2 is not necessarily dedicated to controlling the moving device or giving an instruction to any of the quick charging and discharging equipment 4 and the inter-vehicle charging and discharging equipment 5. In one example embodiment, the control unit 2 may also include application software required for a personal computer.

As illustrated in FIG. 1, in the example embodiment, the parking floors PF provided in the upper-lower direction of the parking facility 1 may be divided into, for example, an upper section, a middle section, and a lower section. In this example case, the parking floor PF or the parking floors PF located in the upper section may be set as a first parking lot P1, the parking floor PF or the parking floors PF located in the lower section may be set as a second parking lot P2, and the parking floor PF or the parking floors PF located in the middle section may be set as a third parking lot P3. The parking facility 1 of the example embodiment may be a multistory parking facility that is built up in the upper-lower direction. Therefore, generally, the first parking lot P1 located in the upper section may have a high temperature, and the second parking lot P2 located in the lower section may have a low temperature. That is, in the parking facility 1, the first parking lot P1 may have a temperature higher than the second parking lot P2, and/or the first parking lot P1 may be located in a section or a floor upper than the second parking lot P2. As described above, a drive battery included in an electric vehicle, such as a lithium-ion battery, has a trade-off property. That is, a higher temperature may result in increase in chargeable and dischargeable electric power of the drive battery: on the other hand, a high temperature may result in easier degradation of the drive battery. Accordingly, in the example embodiment, the vehicle V scheduled to travel may be moved to and parked in the first parking lot P1 having a high temperature, and the vehicle V not scheduled to travel may be moved to and parked in the second parking lot P2 having a low temperature. That is, the vehicle V to be moved to and parked in the first parking lot P1 may be a dispatch vehicle to be dispatched for a vehicle user, and the vehicle V to be moved to and parked in the second parking lot P2 may be a storage vehicle to be stored. Note that the vehicle V after being used by a vehicle user may be moved to and temporarily parked in the third parking lot P3.

In addition, in the example embodiment, the vehicle V may be moved and parked in the parking facility 1 in accordance with a traveling schedule of a vehicle user such as a rental-car customer. In this case, for example, to meet a request from the vehicle user who wishes to use the vehicle V immediately, the SOC value of the drive battery of each vehicle V in the first parking lot P1 may be monitored. In a case where the SOC value of the drive battery decreases to a predetermined value or lower, the drive battery of the vehicle V may be charged by means of the quick charging and discharging equipment 4 or the inter-vehicle charging and discharging equipment 5. In one embodiment, the vehicle V including the drive battery having the SOC value of the predetermined value or lower may serve as an "unsatisfied vehicle". For example, in a case where the vehicle V that is able to travel in accordance with the use of the vehicle user, i.e., the vehicle V that is able to travel a scheduled traveling distance at a scheduled traveling timing is not present in the first parking lot P1, and where time to charge is left by the scheduled traveling timing, the vehicle V in the second parking lot P2 may be moved to the first parking lot P1, and the drive battery of the moved vehicle V may be charged with use of the quick charging and discharging equipment 4 or the inter-vehicle charging and discharging equipment 5.

FIGS. 3 to 6 are each a flowchart of an example of a calculation process to be performed in the control unit 2. Among these flowcharts, the one illustrated in FIG. 6 describes a subroutine of the calculation process illustrated in FIG. 5. Other flowcharts are each an independent calculation process to be performed at an independent sampling cycle or at an independent execution timing. Note that data of a vehicle dispatch request, a scheduled traveling timing thereof, a scheduled traveling distance thereof, etc. which will be described later may be supplied to the control unit 2 by an independent input device or method such as a telecommunication network. Further, for example, in a case of a rental car business, when a vehicle V that has been actually dispatched returns to the parking facility 1, that vehicle V may be additionally included in search target vehicles which will be described later.

Figure 3:
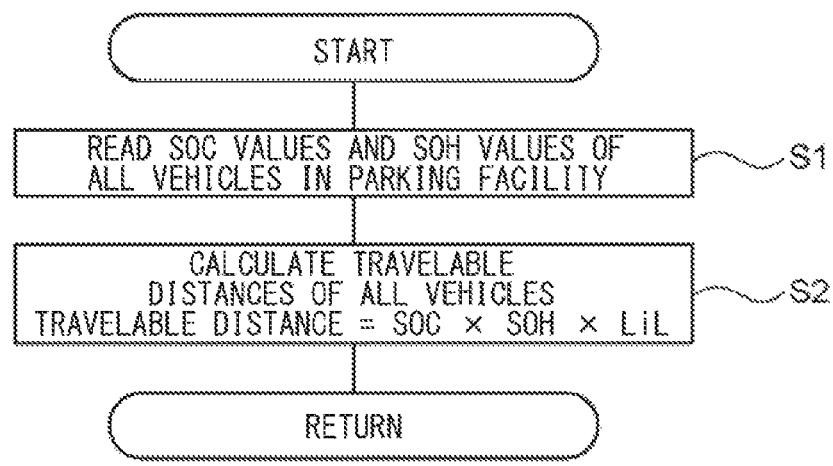
FIG. 3 is a flowchart illustrating an example of a calculation process to be performed by a control unit illustrated in FIG. 1.

The calculation process of the flowchart illustrated in FIG. 3 may be executed at a sampling cycle of relatively high frequency. First, in step S1, the control unit 2 may read the respective SOC values and the respective SOH values of all of the vehicles V in the parking facility 1 transmitted from the respective vehicles V as described above. The SOC value may refer to a rate of a current charge state to a fully charged state of the drive battery. The SOH value may refer to a rate of a current health state to a health state of an undeteriorated drive battery, i.e., a new drive battery.

Thereafter, the process may be caused to proceed to step S2. In step S2, the control unit 2 may calculate respective travelable distances of all of the vehicles V. Thereafter, the control unit 2 may return from the process. The travelable distance may be obtained by multiplying a product of the SOC value and the SOH value by a travelable distance (LiL) in a non-deteriorated and fully charged state. The travelable distance (LiL) in the non-deteriorated and fully charged state may refer to a travelable distance in a case where the drive battery has not been degraded yet, i.e., is new, and is fully charged.

According to this calculation process, the respective travelable distances of all of the vehicles V in the parking facility 1 may be appropriately calculated at a predetermined sampling cycle. In the calculation process, the travelable distance may be calculated with use of the product of the SOC value and the SOH value. This makes it possible to properly determine a distance travelable by the vehicle V with the current state of the drive battery.

Figure 4:
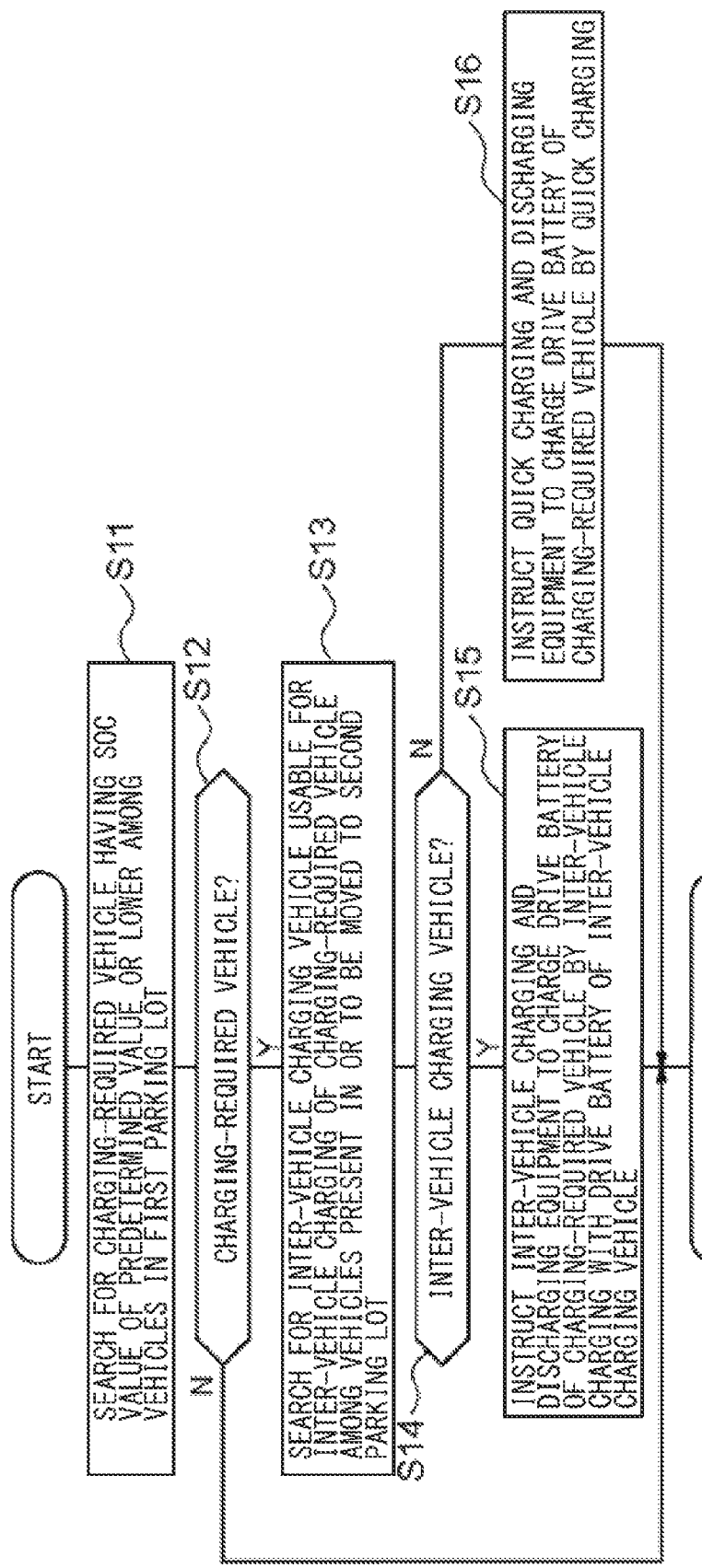
FIG. 4 is a flowchart illustrating an example of another calculation process to be performed by the control unit illustrated in FIG. 1.

The calculation process of the flowchart illustrated in FIG. 4 may be executed at an execution cycle of relatively low frequency. First, in step S11, the control unit 2 may search for a charging-required vehicle among the vehicles V present in the first parking lot P1. The charging-required vehicle may refer to the vehicle V having the SOC value that is a predetermined value or lower. The predetermined value may be set in advance, for example, to an SOC value slightly lower than the SOC value in a fully charged state.

Thereafter, the process may be caused to proceed to step S12. In step S12, the control unit 2 may determine whether the charging-required vehicle is present. In a case where the charging-required vehicle is present (Y in step S12), the process may be caused to proceed to step S13. In a case where the charging-required vehicle is not present (N in step S12), the control unit 2 may return from the process.

In step S13, the control unit 2 may search for an inter-vehicle charging vehicle among the vehicles V present in the second parking lot P2 and the vehicles V to be moved to the second parking lot P2. The inter-vehicle charging vehicle may refer to the vehicle V that is usable to charge the charging-required vehicle, i.e., the vehicle V (in the second parking lot P2) that has enough electric power in its drive battery to charge the drive battery of the charging-required vehicle. Note that the number of the inter-vehicle charging vehicles is not limited to one.

Thereafter, the process may be caused to proceed to step S14. In step S14, the control unit 2 may determine whether the inter-vehicle charging vehicle is present. In a case where the inter-vehicle charging vehicle is present (Y in step S14), the process may be caused to proceed to step S15. In a case where the inter-vehicle charging vehicle is not present (N in step S14), the process may be caused to proceed to step S16.

In step S15, the control unit 2 may instruct the inter-vehicle charging and discharging equipment 5 to charge the drive battery of the charging-required vehicle by means of inter-vehicle charging with use of the drive battery of the inter-vehicle charging vehicle. Thereafter, the control unit 2 may return from the process.

In step S16, the control unit 2 may instruct the quick charging and discharging equipment 4 to perform quick charging of the drive battery of the quick-charging-required vehicle. Thereafter, the control unit 2 may return from the process.

According to this calculation process, in a case where the SOC value of the drive battery of the vehicle V present in the first parking lot P1, where the dispatch vehicles are parked, decreases to the predetermined value or lower, the drive battery of that vehicle V may be charged by means of inter-vehicle charging or quick charging. Accordingly, it is possible to surely meet a request from the vehicle user such as a rental-car customer, for example, a request for immediate use. Further, in a case where the above-described charging-required vehicle present in the first parking lot P1 is chargeable by means of inter-vehicle charging with use of the storage vehicle present in the second parking lot P2, the drive battery of the charging-required vehicle may be charged by means of inter-vehicle charging with use of the drive battery of the storage vehicle present in the second parking lot P2. Therefore, the SOC value of the drive battery of the storage vehicle, which is present in the second parking lot P2 and has been used for the inter-vehicle charging, may be adjusted in accordance with the amount of electric power used in the inter-vehicle charging. The drive battery such as a lithium-ion battery may have a property that the drive battery is easily deteriorated depending on the SOC value (Generally, a higher SOC value causes easier deterioration; however, some batteries are easily deteriorated by a particular SOC value). Therefore, adjusting the SOC value of the drive battery of the storage vehicle helps to suppress degradation of the drive battery.

Figure 5:
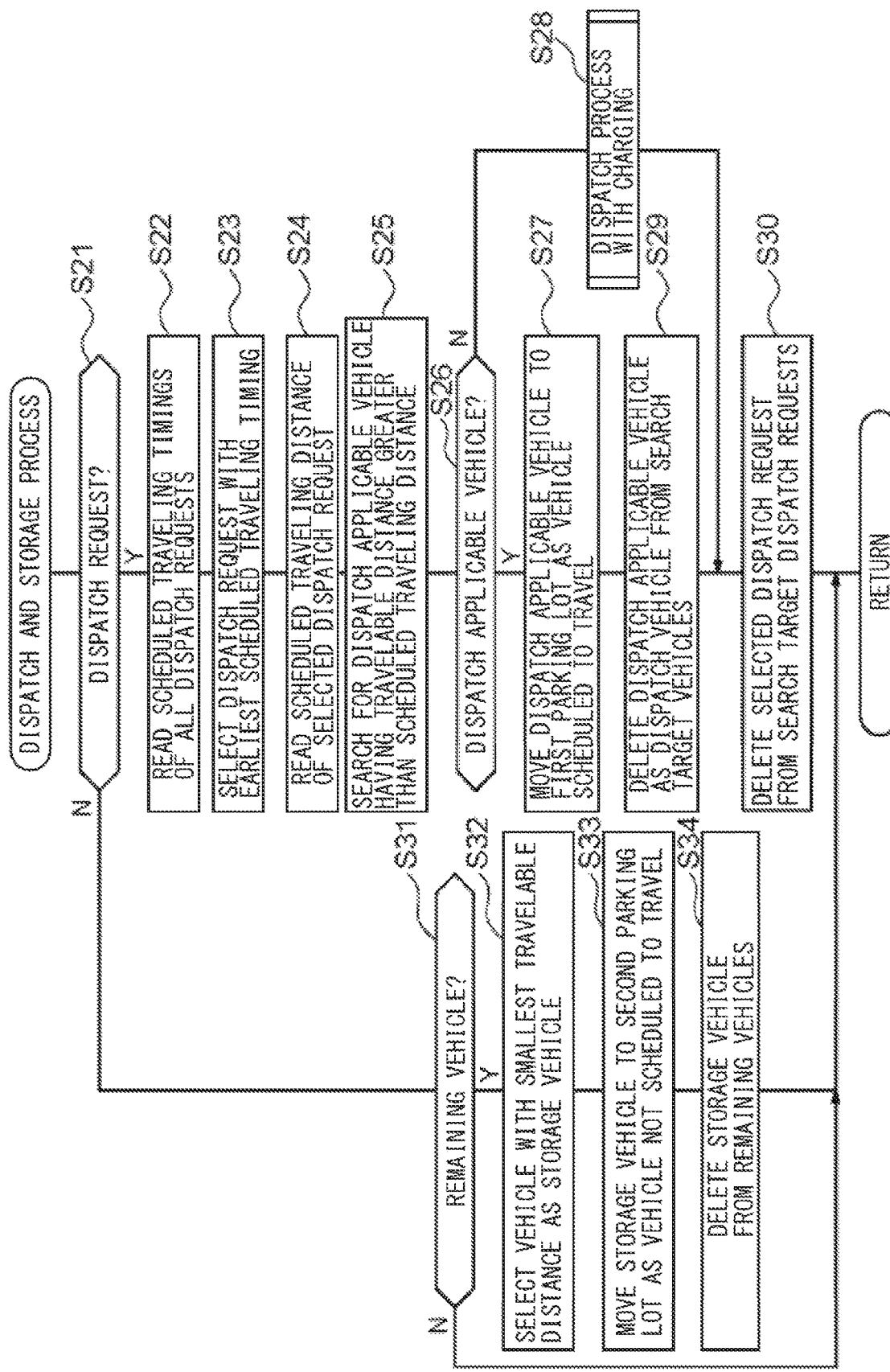
FIG. 5 is a flowchart illustrating an example of still another calculation process to be performed by the control unit illustrated in FIG. 1.

The calculation process of the flowchart illustrated in FIG. 5 may be executed, for example, in a case where a dispatch request is made by the vehicle user, in a case where an operator gives an instruction to dispatch or store the vehicle, or at an execution cycle of relatively low frequency. First, in step S21, the control unit 2 may determine whether a dispatch request has been made. In a case where the dispatch request has been made (Y in step S21), the process may be caused to proceed to step S22. In a case where the dispatch request has not been made (N in step S21), the process may be caused to proceed to step S31. The dispatch requests may be read, for example, in a form of a list of dispatch requests.

In step S22, the control unit 2 may read the respective scheduled traveling timings of all of the dispatch requests. Thereafter, the process may be caused to proceed to step S23.

In step S23, the control unit 2 may select the dispatch request with the earliest scheduled traveling timing among the scheduled traveling timings read in step S22. Thereafter, the process may be caused to proceed to step S24.

In step S24, the control unit 2 may read the scheduled traveling distance of the dispatch request selected in step S23. Thereafter, the process may be caused to proceed to step S25.

In step S25, the control unit 2 may search, as a dispatch applicable vehicle, for a vehicle V having the travelable distance calculated by the calculation process in FIG. 3, that exceeds the scheduled traveling distance read in step S24, among all of the vehicles V present in the parking facility 1. Thereafter, the process may be caused to proceed to step S26. That is, in step S25, the control unit 2 may search for a vehicle V that is able to travel the scheduled traveling distance without being charged by means of the quick charging and discharging equipment 4 or the inter-vehicle charging and discharging equipment 5.

In step S26, the control unit 2 may determine whether the dispatch applicable vehicle is present. In a case where the dispatch applicable vehicle is present (Y in step S26), the process may be caused to proceed to step S27. In a case where the dispatch applicable vehicle is not present (N in step S26), the process may be caused to proceed to step S28.

In step S27, the control unit 2 may move the dispatch applicable vehicle to the first parking lot P1 as a vehicle V scheduled to travel. Thereafter, the process may be caused to proceed to step S29. Note that, in a case where the dispatch applicable vehicle is present in the first parking lot P1, the control unit 2 may not move vehicles V.

In step S29, the control unit 2 may set the dispatch applicable vehicle as a dispatch vehicle and delete that vehicle V from the search target vehicles to be searched upon dispatch requests. Thereafter, the process may be caused to proceed to step S30.

Figure 6:
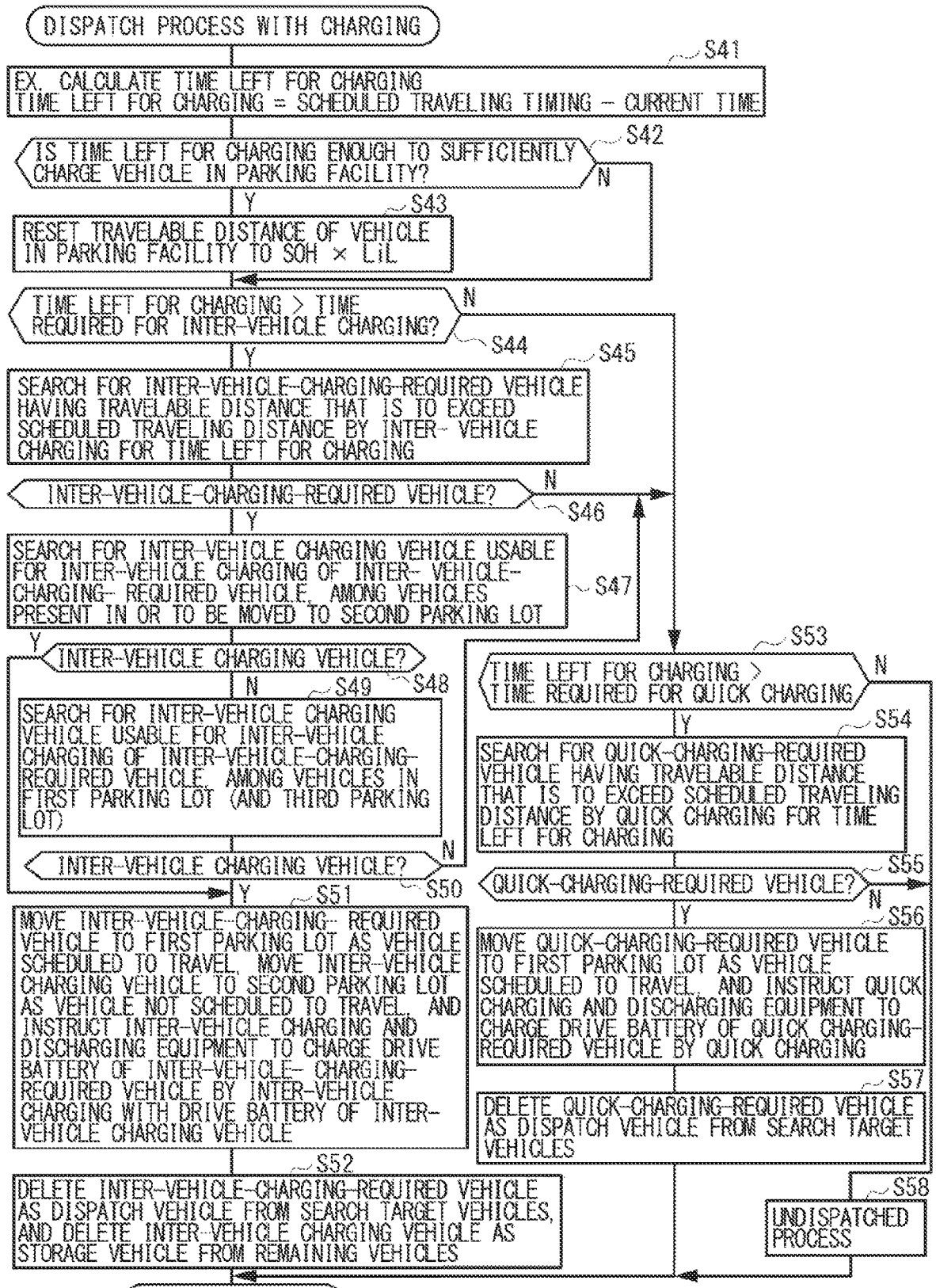
FIG. 6 is a flowchart illustrating an example of a subroutine involved in the calculation process illustrated in FIG. 5.

In step S28, the control unit 2 may perform the calculation process of the subroutine illustrated in FIG. 6, for example, a dispatch process with charging. Thereafter, the process may be caused to proceed to step S30.

In step S30, the control unit 2 may delete the dispatch request selected in step S23 from the search target dispatch requests in the form of a list. Thereafter, the control unit 2 may return from the process.

In step S31, the control unit 2 may determine whether a remaining vehicle is present. In a case where the remaining vehicle is present (Y in step S31), the process may be caused to proceed to step S32. In a case where the remaining vehicle is not present (N in step S31), the control unit 2 may return from the process. The remaining vehicle may refer to the search target vehicle present in the first parking lot P1.

In step S32, the control unit 2 may select a vehicle V with the smallest travelable distance among the remaining vehicles present in the first parking lot P1 as a storage vehicle. Thereafter, the process may be caused to proceed to step S33.

In step S33, the control unit 2 may move the storage vehicle selected in step S32 to the second parking lot P2. Thereafter, the process may be caused to proceed to step S34. Note that, in a case where the storage vehicle is present in the second parking lot P2, the control unit 2 may not move vehicles V.

In step S34, the control unit 2 may delete the above-described storage vehicle from the remaining vehicles. Thereafter, the control unit 2 may return from the process.

According to this calculation process, a dispatch request with an early scheduled traveling timing may be selected from among the dispatch requests made by the vehicle users such as rental-car customers. Further, in a case where a vehicle V having a travelable distance that is greater than the scheduled traveling distance is present, that vehicle V may be moved to and parked in the first parking lot P1 as the dispatch applicable vehicle. As described above, the first parking lot P1 may have a high temperature. Therefore, it is possible to secure a high charging and discharging performance of the drive battery of the dispatch applicable vehicle moved to and parked in the first parking lot P1, i.e., the vehicle V scheduled to travel.

Moreover, in this calculation process, the vehicle V having the smallest travelable distance may be selected as a storage vehicle not scheduled to travel among the search target vehicles present in the first parking lot P1, i.e., the remaining vehicles. Further, the vehicle V selected as the storage vehicle may be moved to and parked in the second parking lot P2. A vehicle having a small travelable distance requires time to sufficiently charge its drive battery. Therefore, even if charging of the drive battery is started in response to the dispatch request, the drive battery may not be sufficiently charged by the scheduled traveling timing. Accordingly, the vehicle V, the possibility of completion of sufficient charging of which by the scheduled traveling timing is low, may be set as the storage vehicle. Moreover, a vehicle having a small travelable distance generally has a low SOC value. As described above, the drive battery may be easily deteriorated depending on the SOC value. Therefore, the vehicle V including the drive battery having the SOC value which causes less deterioration may be given priority to be moved to and parked in the second parking lot P2 with a low temperature as the storage vehicle. This makes it possible to more effectively suppress deterioration of the drive battery.

Next, the calculation process of the subroutine to be executed in step S28 of the calculation process illustrated in FIG. 5, i.e., the dispatch process with charging is described with reference to the flowchart illustrated in FIG. 6. In the calculation process of this subroutine, first, in step S41, the control unit 2 may calculate time left for charging. The time left for charging may be obtained, for example, by subtracting the current time from the scheduled traveling timing (time).

Thereafter, the process may be caused to proceed to step S42. In step S42, the control unit 2 may determine whether the time left for charging calculated in step S41 is enough to sufficiently charge the vehicle V in the parking facility 1. In a case where the time left for charging is enough to sufficiently charge the vehicle V (Y in step S42), the process may be caused to proceed to step S43. In a case where the time left for charging is not enough to sufficiently charge the vehicle V (N in step S42), the process may be caused to proceed to step S44.

In step S43, the control unit 2 may reset the travelable distance of the vehicle V in the parking facility 1 to the product of the SOH value and the travelable distance (LiL) in the non-deteriorated and fully charged state. Thereafter, the process may be caused to proceed to step S44.

In step S44, the control unit 2 may determine whether the time left for charging calculated in step S41 is longer than time required for inter-vehicle charging. In a case where the time left for charging is longer than the time required for inter-vehicle charging (Y in step S44), the process may be caused to proceed to step S45. In a case where the time left for charging is not longer than the time required for inter-vehicle charging (N in step S44), the process may be caused to proceed to step S53. The time required for inter-vehicle charging may refer to, for example, time required to charge the drive battery of the vehicle V having a representative SOC value up to a sufficient SOC value by means of inter-vehicle charging.

In step S45, the control unit 2 may search for an inter-vehicle-charging-required vehicle having a travelable distance that is to exceed the scheduled traveling distance if the inter-vehicle charging is performed for the time left for charging. Thereafter, the process may be caused to proceed to step S46.

In step S46, the control unit 2 may determine whether the inter-vehicle-charging-required vehicle is present. In a case where the inter-vehicle-charging-required vehicle is present (Y in step S46), the process may be caused to proceed to step S47. In a case where the inter-vehicle-charging-required vehicle is not present (N in step S46), the process may be caused to proceed to step S53.

In step S47, the control unit 2 may search for an inter-vehicle charging vehicle that is usable for inter-vehicle charging of the inter-vehicle-charging-required vehicle, among the vehicles V present in the second parking lot P2 or the vehicles V to be moved to the second parking lot P2. Thereafter, the process may be caused to proceed to step S48.

In step S48, the control unit 2 may determine whether the inter-vehicle charging vehicle is present on the basis of the searching performed in step S47. In a case where the inter-vehicle charging vehicle is present (Y in step S48), the process may be caused to proceed to step S51. In a case where the inter-vehicle charging vehicle is not present (N in step S48), the process may be caused to proceed to step S49.

In step S49, the control unit 2 may search for the inter-vehicle charging vehicle that is usable for inter-vehicle charging of the inter-vehicle-charging-required vehicle among the vehicles V present in the first parking lot P1 (and the third parking lot P3). Thereafter, the process may be caused to proceed to step S50.

In step S50, the control unit 2 may determine whether the inter-vehicle charging vehicle is present on the basis of the searching in step S49. In a case where the inter-vehicle charging vehicle is present (Y in step S50), the process may be caused to proceed to step S51. In a case where the inter-vehicle charging vehicle is not present (N in step S50), the process may be caused to proceed to step S53.

In step S51, the control unit 2 may move the inter-vehicle-charging-required vehicle to the first parking lot P1 as a vehicle V scheduled to travel. In addition, the control unit 2 may move the inter-vehicle charging vehicle to the second parking lot P2 as a vehicle V not scheduled to travel. Further, the control unit 2 may instruct the inter-vehicle charging and discharging equipment 5 to charge the drive battery of the inter-vehicle-charging-required vehicle by means of inter-vehicle charging with use of the drive battery of the inter-vehicle charging vehicle. Thereafter, the process may be caused to proceed to step S52. Note that the control unit 2 may not move vehicles, for example, in a case where the inter-vehicle-charging-required vehicle is present in the first parking lot P1, or in a case where the inter-vehicle charging vehicle is present in the second parking lot P2.

In step S52, the control unit 2 may set the inter-vehicle-charging-required vehicle as a dispatch vehicle and delete that vehicle from the search target vehicles. The control unit 2 may also delete the inter-vehicle charging vehicle from the remaining vehicles. Thereafter, the process may be caused to proceed to step S30 of the calculation process illustrated in FIG. 5 described above.

In step S53, the control unit 2 may determine whether the time left for charging calculated in step S41 is longer than time required for quick charging. In a case where the time left for charging is longer than the time required for quick charging (Y in step S53), the process may be caused to proceed to step S54. In a case where the time left for charging is not longer than the time required for quick charging (N in step S53), the process may be caused to proceed to step S58. The time required for quick charging may refer to, for example, time required to charge the drive battery of the vehicle V having a representative SOC value up to a sufficient SOC value by means of quick charging.

In step S54, the control unit 2 may search for a quick-charging-required vehicle having a travelable distance that is to exceed the scheduled traveling distance if quick charging is performed for the time left for charging. Thereafter, the process may be caused to proceed to step S55.

In step S55, the control unit 2 may determine whether the quick-charging-required vehicle is present. In a case where the quick-charging-required vehicle is present (Y in step S55), the process may be caused to proceed to step S56. In a case where the quick-charging-required vehicle is not present (N in step S55), the process may be caused to proceed to step S58.

In step S56, the control unit 2 may move the quick-charging-required vehicle to the first parking lot P1 as a vehicle V scheduled to travel. In addition, the control unit 2 may instruct the quick charging and discharging equipment 4 to charge the drive battery of the quick-charging-required vehicle by means of quick charging. Thereafter, the process may be caused to proceed to step S57. Note that the control unit 2 may not move vehicles V, for example, in a case where the quick-charging-required vehicle is present in the first parking lot P1.

In step S57, the control unit 2 may set the quick-charging-required vehicle as a dispatch vehicle and delete that vehicle V from the search target vehicles. Thereafter, the process may be caused to proceed to step S30 of the calculation process illustrated in FIG. 5 described above.

In step S58, the control unit 2 may perform a process appropriate for a case where no vehicle is to be dispatched for the selected dispatch request. Thereafter, the process may be caused to proceed to step S30 of the calculation process illustrated in FIG. 5 described above.

In this calculation process, in a case where the time left for charging that is up to the scheduled traveling time is enough to sufficiently charge the drive battery of the vehicle V present in the parking facility 1, the travelable distance of each vehicle V may be reset on the basis of the SOH value. If it is possible to sufficiently charge the drive battery of each vehicle V, it may not be necessary to take into consideration the current SOC value. Therefore, the travelable distance may be reset taking into consideration only the SOH value of each vehicle V.

In a case where inter-vehicle charging is allowed in the time left for charging, first, the inter-vehicle-charging-required vehicle having a travelable distance that is to exceed the scheduled traveling distance if the inter-vehicle charging is performed for the time left for charging may be searched for. In a case where the inter-vehicle-charging-required vehicle is present, first, an inter-vehicle charging vehicle that is usable for inter-vehicle charging of the inter-vehicle-charging-required vehicle may be searched for among the vehicles V present in the second parking lot P2. In a case where the inter-vehicle charging vehicle is present in the second parking lot P2, the drive battery of the inter-vehicle-charging-required vehicle may be charged by means of inter-vehicle charging with use of the drive battery of that inter-vehicle charging vehicle. In a case where the inter-vehicle charging vehicle is not present in the second parking lot P2, the inter-vehicle charging vehicle may be searched for among the vehicles V in the first parking lot P1 or the third parking lot P3. In a case where the inter-vehicle charging vehicle is present in the first parking lot P1 or the third parking lot P3, the drive battery of the inter-vehicle-charging-required vehicle may be charged by means of inter-vehicle charging with use of the drive battery of that inter-vehicle charging vehicle. The vehicle V charged by means of the inter-vehicle charging may be moved to and parked in the first parking lot P1 having a high temperature as a dispatch vehicle. The vehicle V including the drive battery having the SOC value reduced as a result of the inter-vehicle charging may be moved to and parked in the second parking lot P2 having a low temperature as a storage vehicle. Effects in these cases may be similar to those described in relation to the calculation processes illustrated in FIGS. 4 and 5.

In a case where the inter-vehicle-charging-required vehicle is not present and where quick charging is allowed in the time left for charging, the quick-charging-required vehicle having a travelable distance that is to exceed the scheduled traveling distance if quick charging is performed for the time left for charging may be searched for. In a case where the quick-charging-required vehicle is present, the quick-charging-required vehicle may be charged by means of quick charging performed by the quick charging and discharging equipment 4. The vehicle V charged by means of the quick charging may be moved to and parked in the first parking lot P1 having a high temperature as a dispatch vehicle. Effects in this case may be similar to those described in relation to the calculation process illustrated in FIG. 5.

As described above, regarding the parking system of the example embodiment, the vehicle V not scheduled to travel may be moved to the second parking lot P2 having a low temperature as a storage vehicle. Accordingly, it is possible to suppress unnecessary degradation of the drive battery of the storage vehicle. In contrast, the vehicle V scheduled to travel may be moved to the first parking lot P1 having a high temperature as a dispatch vehicle to be used in the future. Accordingly, it is possible to secure a charging and discharging performance of the drive battery of the dispatch vehicle. Further, in a case where the charge state of the drive battery of the vehicle V scheduled to travel and present in the first parking lot P1 is lower than a predetermined charge state, charging of the drive battery of the vehicle V with the use of the charging and discharging equipment 4 or the charging and discharging equipment 5 may be instructed. Accordingly, it is possible to keep the charge state of the drive battery of the vehicle V present in the first parking lot P1 to be a predetermined travelable state.

Moreover, in a case where a dispatch applicable vehicle is selected from the vehicles V present in the parking facility 1 in accordance with the scheduled traveling timing and the scheduled traveling distance of the vehicle user and the selected vehicle is dispatched, the travelable state of the vehicle V may be calculated with use of the SOC value, the SOH value, or both of the drive battery. The vehicle V that is present in the first parking lot P1 and has a travelable distance greater than the scheduled traveling distance may be selected as a dispatch vehicle that is able to travel the scheduled traveling distance at the scheduled traveling timing. Accordingly, it is possible for the vehicle user to travel the scheduled traveling distance without charging the vehicle V.

Moreover, in a case where the dispatch applicable vehicle is not present in the first parking lot P1 and where time to charge the drive battery is left by the scheduled traveling timing, the vehicle V stored in the second parking lot P2 may be moved to the first parking lot P1, and the moved vehicle V may be set as a dispatch vehicle. The drive battery of the dispatch vehicle may be charged by the scheduled traveling timing. Accordingly, it is possible for the vehicle user to travel the scheduled traveling distance without charging the vehicle V.

Moreover, the drive battery of the vehicle V present in the first parking lot P1 and having the SOC value of the predetermined value or lower may be charged by means of inter-vehicle charging with use of the drive battery of the vehicle V stored in the second parking lot P2 having a low temperature. For example, the drive battery such as a lithium-ion battery may have a property that the drive battery is easily deteriorated depending on the SOC value. Therefore, if the drive battery of the vehicle V present in the first parking lot P1 is charged by means of inter-vehicle charging with use of the drive battery of the vehicle V stored in the second parking lot P2, the SOC value of the drive battery of the vehicle V present in the second parking lot P2 may be adjusted. This makes it possible to suppress unnecessary degradation of the drive battery of the vehicle V stored in the second parking lot P2.

Moreover, the travelable distance may be calculated on the basis of the product of the SOH value and the SOC value reflecting an over-time influence of a factor such as the number of times of charging. This makes it possible to calculate the travelable distance more precisely.

The parking system according to one example embodiment of the technology has been described above; however, the embodiment of the technology is not limited to the configuration described with reference to the example embodiment above, and is modifiable in a variety of ways within the scope of the gist of the technology. For example, in the example embodiment described above, the parking floors PF in the upper section of the multistory parking facility may be set as the first parking lot P1 having a high temperature, and the parking floors PF in the lower section may be set as the second parking lot P2 having a low temperature; however, this is non-limiting. For example, the first and the second parking lots may be set in accordance with an actual temperature state in the parking facility. Further, a temperature adjusting device may be provided in each parking lot on an as-needed basis. Moreover, the form of the parking facility is not limited to the multistory parking facility. The embodiment of the technology is applicable to any form of parking facility.

Moreover, a vehicle may be moved to the first parking lot having a high temperature at a time (timing) which is prior to the scheduled traveling timing of the dispatch request by a predetermined time (period). For example, if the vehicle stored in the second parking lot having a low temperature is moved to the first parking lot at a timing much earlier than the scheduled traveling timing, the temperature of the drive battery of the vehicle rises earlier accordingly. This may facilitate degradation of the drive battery. Therefore, in such a case, the vehicle may be moved to the first parking lot slightly prior to the scheduled traveling timing.

Moreover, as described above, usual charging and discharging equipment may be installed instead of the quick charging and discharging equipment in one example embodiment. In another example embodiment, both the quick charging and discharging equipment and the usual charging and discharging equipment may be installed.

Moreover, in a case of a rental car business, a vehicle including a drive battery having a low SOH value, i.e., a more-degraded drive battery may be given priority to be set as a dispatch vehicle.

As described above, according to the parking system of an embodiment of the technology, it is possible to dispatch and store a vehicle while keeping a favorable balance of a trade-off property related to a temperature of a drive battery, and also to keep a dispatch vehicle scheduled to travel in a predetermined travelable state.

The control unit 2 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 2 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 2 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A parking system comprising:
    a parking facility including a first parking lot with a high temperature and a second parking lot with a low temperature;
    a moving device configured to move vehicles in the parking facility, the vehicles including drive batteries such that each of the vehicles includes each of the drive batteries for driving each of the vehicles;
    charging and discharging equipment configured to charge and discharge the drive batteries of the vehicles;
    a battery-state detector configured to detect at least state-of-charge values of the drive batteries of the vehicles; and
    a control processor configured to:
        cause the moving device to move, to the first parking lot, first vehicles that are among the vehicles and scheduled to travel;
        cause the moving device to move, to the second parking lot, second vehicles that are among the vehicles and not scheduled to travel;
        identify an unsatisfied vehicle from the first vehicles on a basis of state-of-charge values of drive batteries of the first vehicles present in the first parking lot detected by the battery-state detector, the unsatisfied vehicle including a drive battery of which a charge state does not reach a predetermined charge state; and
        cause or instruct the charging and discharging equipment to perform charging of the drive battery of the unsatisfied vehicle.

2. The parking system according to claim 1, wherein
    the battery-state detector is further configured to detect state-of-health values of the drive batteries of the vehicles, and
    in a case of selecting an applicable vehicle based on a scheduled traveling timing and a scheduled traveling distance of a vehicle user, and dispatching a dispatch vehicle from the parking facility, the control processor is configured to
    calculate travelable distances of the vehicles on a basis of the state-of-charge values, the state-of-health values, or both, the state-of-charge values and the state-of-charge values being detected by the battery-state detector,
    search for the applicable vehicle that is able to travel the scheduled traveling distance at the scheduled traveling timing on a basis of the travelable distances, and
    select, in a case where the applicable vehicle is present in the first parking lot, the applicable vehicle as the dispatch vehicle.

3. The parking system according to claim 2, wherein,
in a case where the control processor determines that time to charge a drive battery is left by the scheduled traveling timing, the control processor is configured to
cause the moving device to move a third vehicle present in the second parking lot to the first parking lot,
set the third vehicle moved by the moving device to the dispatch vehicle as the applicable vehicle, and
cause or instruct the charging and discharging equipment to perform charging of the drive battery of the third vehicle.

4. The parking system according to claim 2, wherein
the charging and discharging equipment includes inter-vehicle charging and discharging equipment configured to perform mutual charging and discharging between the vehicles, and
the control processor is configured to cause or instruct the inter-vehicle charging and discharging equipment to perform inter-vehicle charging with use of a drive battery of a vehicle that is present in the second parking lot or to be moved to the second parking lot to charge the drive battery of the unsatisfied vehicle present in the first parking lot, when the unsatisfied vehicle has a state-of-charge value, detected by the battery-state detector, that is a predetermined value or lower, the predetermined value being set in advance.

5. The parking system according to claim 3, wherein
the charging and discharging equipment includes inter-vehicle charging and discharging equipment configured to perform mutual charging and discharging between the vehicles, and
the control processor is configured to cause or instruct the inter-vehicle charging and discharging equipment to perform inter-vehicle charging with use of the drive battery of a vehicle that is present in the second parking lot or to be moved to the second parking lot to charge the drive battery of the unsatisfied vehicle present in the first parking lot, when the unsatisfied vehicle has a state-of-charge value, detected by the battery-state detector, that is a predetermined value or lower, the predetermined value being set in advance.

6. The parking system according to claim 2, wherein each of the travelable distances of each of the vehicles is calculated on a basis of a product of each of the state-of-charge values and each of the state-of-health values.

7. The parking system according to claim 3, wherein each of the travelable distances of each of the vehicles is calculated on a basis of a product of each of the state-of-charge values and each of the state-of-health values.

8. The parking system according to claim 4, wherein each of the travelable distance of each of the vehicles is calculated on a basis of a product of each of the state-of-charge values and each of the state-of-health values.

9. The parking system according to claim 5, wherein each of the travelable distance of each of the vehicles is calculated on a basis of a product of each of the state-of-charge values and each of the state-of-health values.

10. A parking system comprising:
a parking facility including a first parking lot with a high temperature and a second parking lot with a low temperature;
a moving device configured to move vehicles in the parking facility, the vehicles including drive batteries such that each of the vehicles includes each of the drive batteries for driving each of the vehicles;
charging and discharging equipment configured to charge and discharge the drive batteries of the vehicles;
a battery-state detector configured to detect at least state-of-charge values of the drive batteries of the vehicles; and
circuitry configured to
cause the moving device to move, to the first parking lot, first vehicles that are among the vehicles and scheduled to travel,
cause the moving device to move, to the second parking lot, second vehicles that are among the vehicles and not scheduled to travel,
identify an unsatisfied vehicle from the first vehicles on a basis of state-of-charge values of drive batteries of the first vehicles present in the first parking lot detected by the battery-state detector, the unsatisfied vehicle including a drive battery of which a charge state does not reach a predetermined charge state, and
cause or instruct the charging and discharging equipment to perform charging of the drive battery of the unsatisfied vehicle.

* * * * *